United States Patent [19]
Ohta

[11] Patent Number: 5,697,788
[45] Date of Patent: Dec. 16, 1997

[54] ALGORITHM TRAINING SYSTEM

[75] Inventor: Koichi Ohta, Kyoto, Japan

[73] Assignee: Aleph Logic Ltd., Kyoto, Japan

[21] Appl. No.: 526,093

[22] Filed: Sep. 11, 1995

[30] Foreign Application Priority Data

Oct. 11, 1994 [JP] Japan ............................ 6-245149

[51] Int. Cl.⁶ ........................................... G09B 19/00
[52] U.S. Cl. ................ 434/118; 434/323; 434/362; 434/365; 395/704; 364/183.14; 364/578
[58] Field of Search ..................... 434/118, 307 R, 434/322, 323, 327, 350, 362, 365; 395/152, 154, 155–161, 183.22, 700, 927, 701, 702, 704, 761; 364/147, 578, 191, DIG. 1, 183.14; 345/156

[56] References Cited

U.S. PATENT DOCUMENTS

| | | | |
|---|---|---|---|
| 4,315,315 | 2/1982 | Kossiakoff | 364/516 X |
| 4,455,619 | 6/1984 | Masui et al. | 395/160 |
| 4,546,435 | 10/1985 | Herbert et al. | 395/700 |
| 4,622,013 | 11/1986 | Cerchio | 434/118 |
| 4,656,603 | 4/1987 | Dunn | 395/159 |
| 5,210,859 | 5/1993 | Aoshima et al. | 395/183.22 |
| 5,259,766 | 11/1993 | Sack et al. | 434/323 X |
| 5,301,198 | 4/1994 | Kawasaki | 395/704 X |
| 5,310,349 | 5/1994 | Daniels et al. | 434/307 R X |
| 5,632,022 | 5/1997 | Warren et al. | 395/702 X |

FOREIGN PATENT DOCUMENTS 4-355830   9/1992   Japan .

*Primary Examiner*—Joe Cheng
*Attorney, Agent, or Firm*—Banner & Witcoff, Ltd.

[57] ABSTRACT

An algorithm training system for training a learner in the computer algorithm is provided. The system has a display device for selectively displaying information including flow-chart symbols and flow-lines. Instruction for an algorithm are entered into the computer from the keyboard or by the mouse operation. The system creates a desired flow-chart using the flow-chart symbols and flow-lines being shown on the display device in accordance with the instructions entered. The algorithm expressed by the resulting flow-chart is verified and its result is also shown on the display device.

4 Claims, 14 Drawing Sheets

101

101

ALGORITHM TRAINING SYSTEM

BACKGROUND OF THE INVENTION

This invention generally relates to an algorithm training system, and in particular to software programs for learning algorithms on computers.

In the past, learning or teaching the algorithm on the personal computer or the workstation has generally been done using programming languages. In learning the algorithm on the computer, a program embodying the particular algorithm is usually written by first creating a flow-chart that visualizes the algorithm, and then converting the flow-chart into a program via a suitable programming language. Therefore, with the prior art approach, the learner must familiarize himself or herself with how to create the flow-chart as well as with what the programming language is all about.

Meanwhile, in recent years, the research into the Graphical User Interface (GUI for short) has been picking up steam. The GUI is a ground-breaking approach for the computer user interface and portrays computer operations and entities as on-screen "icons" that can be recognized faster and understood more readily by the user than words and phrases. The GUI technology has made its way into the field of programming, not a few object-oriented programming languages have already been developed that make the most of various graphic images such as boxes and charts. This is because the graphic information like icons and charts can convey richer information faster than the character-based data (as in the conventional character-based languages). Reflecting the current trend in the GUI technology, it has recently been proposed, a tools for visualize the algorithm, systems to create charts such as the NS chart, the PAD (Problem Analysis Diagram), the HIPO (Hierarchy plus Input-Process-Output) diagram, the dataflow graph, and the state diagram from software programs, or inversely to automatically create computer programs from the charts and programming modules.

However, for learning the programming language, one must understand the construction of the language and have well-established programming skills at the same time, both of which take considerable time and efforts on the part of the learner. While, on the other hand, high-level programming languages that crudely resembles human language have come into being, to be proficient in them is like acquiring professional skills. Not a few learners who anyhow have started out with them give up and throw in the towel at the very beginning or halfway along the process.

As far as the object-oriented programming is concerned, in-screen graphic images such as icons and charts must be capable of representing the algorithms crystal-clear. But the state of the prior art falls short of this capability in that many of the prior-art graphic representations are neither symbolic enough in nature nor instantly appealing to the user. On top of it, there exist no standard systems for creating the graphical charts in the industry.

SUMMARY OF THE INVENTION

It is therefore an object of the present invention to provide a new and improved system for training computer users or programmers in the computer-readable algorithm.

It is another object to the present invention to provide a new and improved software application for learning the algorithm on the computer.

In order to accomplish these and other objects, the algorithm training system according to a preferred embodiment of the invention comprises means for selectively displaying various data including flow-chart symbols and flow-lines; input means for entering instructions; means for creating a desired flow-chart using the symbols and flow-lines being shown on the display means in accordance with the instructions entered by the input means; and means for verifying the algorithm represented by the created flow-chart and showing verification results on the display means.

For enabling the learner to additionally learn the relationships between the flow-chart and the program, converting means may preferably be added for translating the finished flow-chart into a computer program written by a desired programming language and for showing the resultant program on the display means. In the present invention, the programming language includes the so-called high-level programming language such as Visual Basic, C-language, FORTRAN and COBOL, and the macro language to create macros for carrying out a set of instructions in an application program.

The flow-chart creating means in accordance with the invention may typically comprises selection means for selecting the desired flow-chart symbols and flow-lines from among those shown on the display means, and character input means for entering into the selected flow-chart symbol a desired string of characters.

With the above arrangement of the invention, the flow-chart creating means designs and formulates a flow-chart using the flow-chart symbols and flow-lines shown on the display means in accordance with the instructions entered by the input means, after which the verifying means makes the verification of the algorithm represented by the flow-chart and shows the results on the display means. This will make it possible for the learner of the algorithm to understand the target algorithm while creating a flow-chart based on the structure programming. Phrased differently, since expressing an algorithm with standardized flow-chart symbols directly leads to the verification of the algorithm itself, the necessity for expressing the algorithm in generally used programming language is eliminated. As a result of this, the learner of the algorithm can validate any algorithm without mastering a programming language, which requires higher intelligence and good memory.

DETAILED DESCRIPTION OF THE PREFERRED EMBODIMENTS

Figure 1:
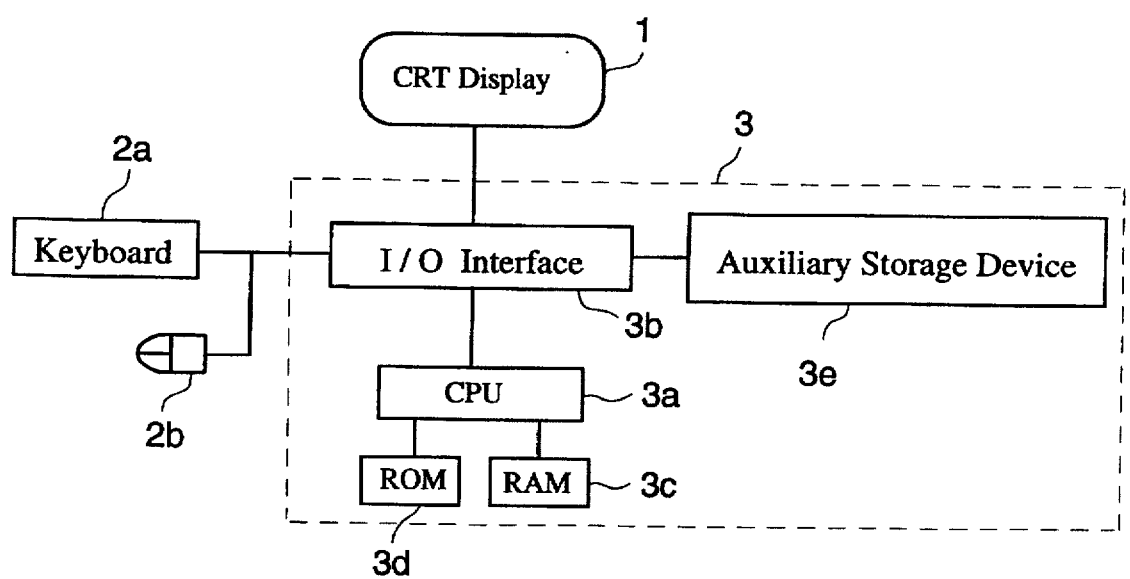
FIG. 1 is a block diagram schematically illustrating the whole arrangement of one preferred embodiment of the invention.
Figure 2:
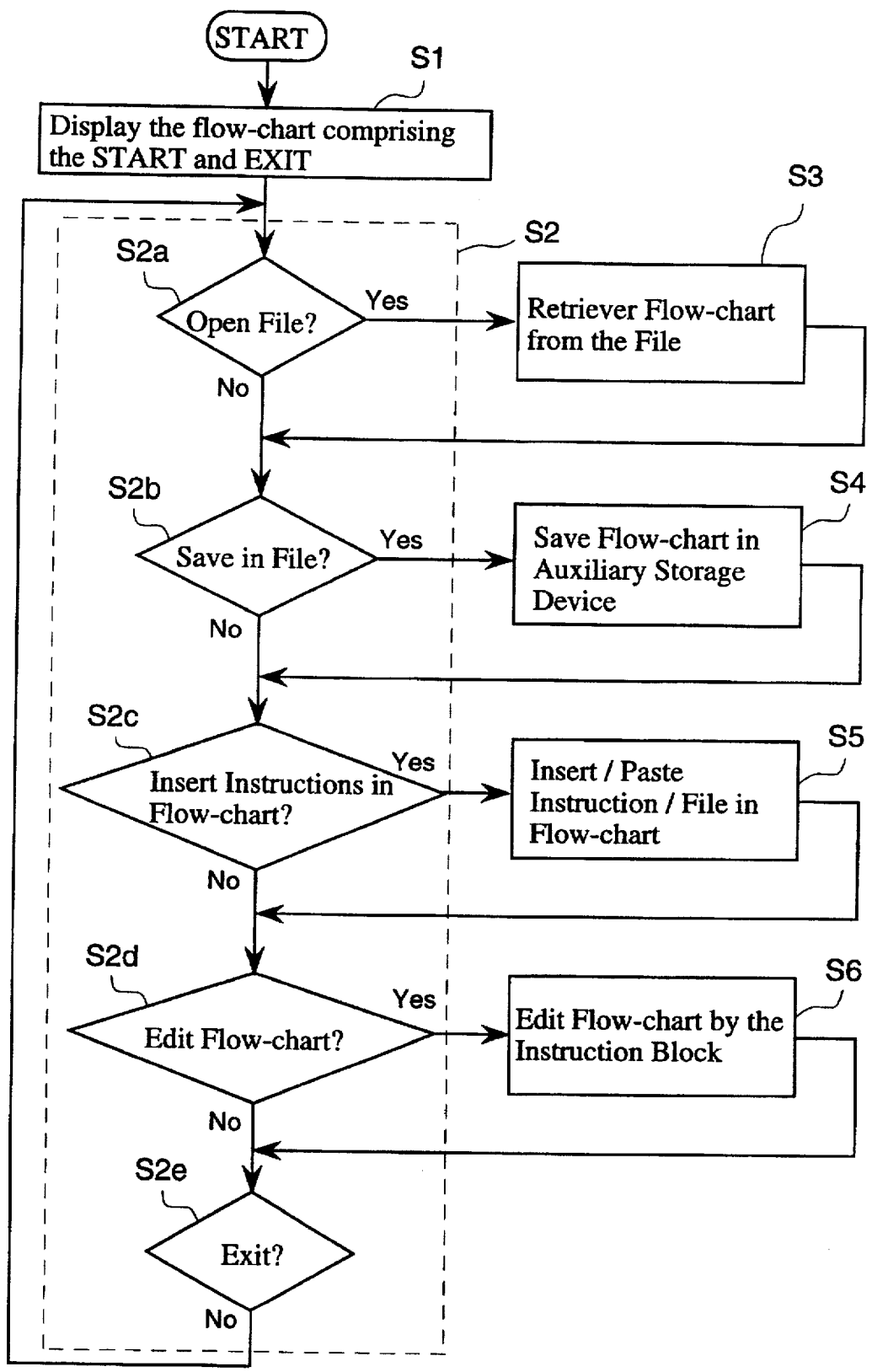
FIG. 2 is a flow-chart illustrating the executing procedure for the instructions in the start-up algorithm window.

The computer system for training in the algorithm according to one preferred embodiment of the invention comprises, as shown in FIG. 1, a CRT display 1 as the visual display device, a keyboard 2a and a mouse 2b as the input devices, and a computer proper 3. This hardware arrangement is just an example and the present invention is not limited thereto. Thus any personal computer or workstation now in wide use may be utilized to advantage, and so is any operating system (hereinafter referred to as the OS). The computer may comprise a 32-bit CPU (central processing unit) 3a, input/output interface 3b, RAM 3c, ROM 3d, and an auxiliary data storage device 3e such as a hard disc drive and a floppy disk drive. In this arrangement, the CRT display 1 and the computer 3 with the necessary software programs installed make up display means for selectively displaying various information and data including flow-chart symbols and flow lines, while the keyboard 2a and the mouse 2b together with the computer with the necessary software programs installed form the instruction input means for entering variety of instructions. Likewise, means for creating desired flow diagrams (herein after referred to as "flow charts") using the flow-chart symbols and flow-lines in accordance with the instructions entered by the instruction input means, and means for verifying the algorithm represented by the flow-chart(s) which have been produced by the flow-chart creating means as well as for showing the verified results on the display means are both realized by installing into the computer 3 the algorithm training program or software which will be described in detail below.

On the other hand, the computer 3 has the installed OS for realizing the GUI so that the application programs to be run on the OS including the algorithm training software are displayed or presented as icons. In this type of the OS, for example, WINDOWS (a trademark for Microsoft USA), icons and menu bars are shown on the CRT display, and when the curser or pointer is moved onto one of them and the mouse is clicked, then the task which the clicked icon or menu bar is supposed to do is executed. Clicking the mouse 2b means pressing the switch button on the mouse 2b, by which the selection of the icon or the curser position can be entered into the computer 3 without necessarily touching the keyboard 2a.

The algorithm training software incorporates as its programing language, for example, Visual Basic, C-language, FORTRAN or COBOL, and it is possible to express the algorithm created using the present software in any of these programming language. The algorithm training software is of the construction as schematically illustrated in FIGS. 2–6. The command/instruction symbols and their description rules for the flow-charts used in the present software program are based on those of JIS (Japanese Industrial Standard) X0121: "Flow-chart Symbols for Information Processing."

Figure 7:
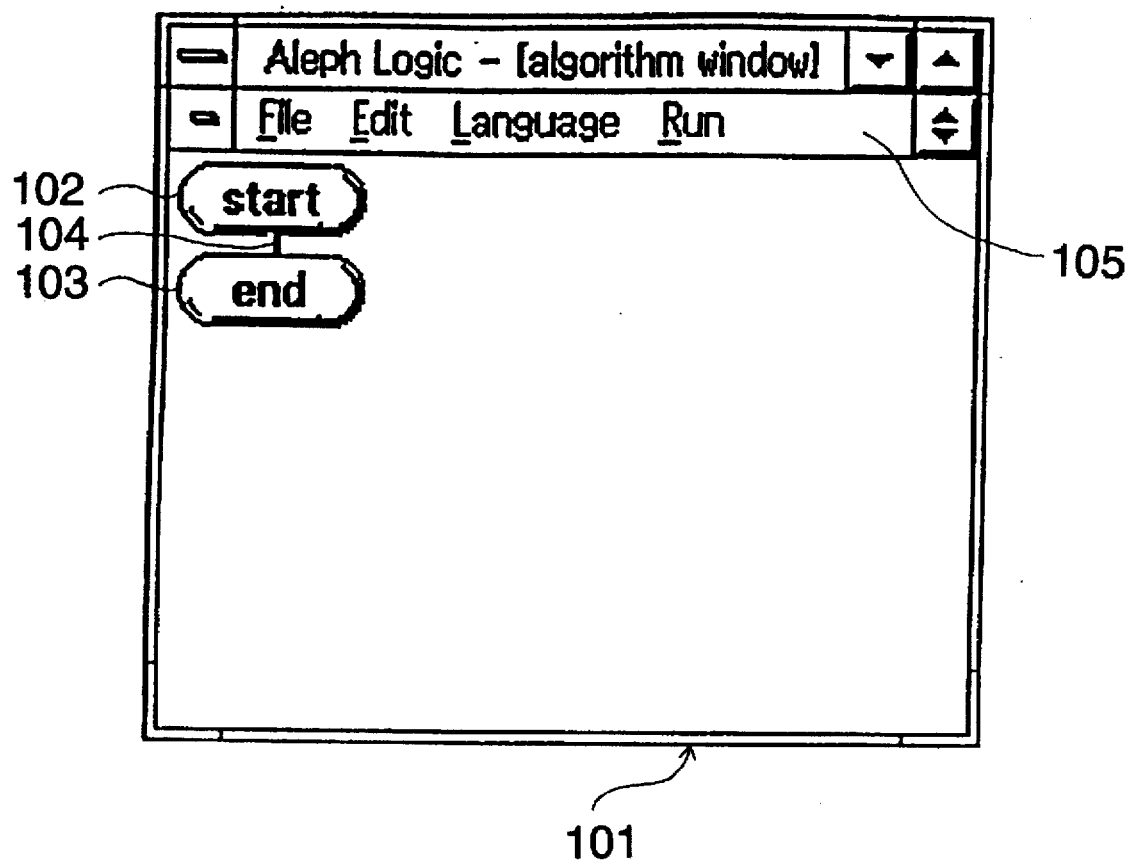
FIG. 7 is an illustration showing the start-up algorithm window of the present program.

At step S1, an algorithm window 101 for creating the flow-chart suitable for a desired algorithm is shown as the initial screen on the display 1 (FIG. 7). On this initial algorithm window screen 101, a start button 102 depicted as "START" and an exit button 103 indicated as "EXIT" are shown connected by a flow-line button 104 represented with a vertical flow-line symbol. With this representation, the displayed flow-line symbol itself functions as a button. Meanwhile, a button works as a switch to execute the defined task when clicked after moving the pointer or curser thereto on the display screen by manipulating the mouse. It should be noted that when the flow-chart already saved in the auxiliary storage device 3e is accessed, the algorithm window 101 also appears on the screen together with the retrieved flow-chart. Thus a plurality of algorithm windows including the one you are currently working on can be shown on the single display screen. Moreover, as with other windows explained hereinbelow, the on-screen algorithm window 101 can be changed freely in size between the minimum size and the maximum size where the window 101 expands itself to the full space of the screen. In case the whole of the flow-chart cannot be displayed within the algorithm widow 101, it can be shown by scrolling up and down or right and left.

At step S2, any instruction inputs that will be entered after the initial screen has been displayed is verified. The file menu in the menu bar 105 contains "Open File", "Save File As . . . ", "Edit Flow-chart", and "Exit." Also, entering the inserting position of the instruction symbol as well as the insert instruction by clicking the flow-line button 104 in the algorithm window are also valid. The verification of the inputs at step S2 is carried out in the order of step S2a "OpenFile", step s2b "Save File As", step S2c "Insert Command Symbol in Flow-chart" (whether the flow-line button is clicked or not), step S2d "Edit Flow-chart", and step S2e "Exit." If "Open File" is verified at step S2a, then the verification process goes on to the step S3. If "Save File As" is verified at step S2b, then the verification process goes on to the step S4. If "Insert Command Symbol in Flowchart" is verified at step S2c, then the verification process goes on to the step S5. If "Edit Flow-chart" is verified at step S2d, then the verification process goes on to the step S6. If "Exit" is verified, then the whole process comes to an end.

At step S3, the flow-chart is accessed and retrieved on-screen from the file saved in the auxiliary storage device 3e. At step S4, the newly created or edited flow-chart is saved in the storage device 3e. At step S5, depending on the instruction entered, one of the following procedures is carried out: the instruction symbol 201 is newly inserted (instruction inserting) into the flow-chart; the instruction symbol is cut out or copied from the same or other file and inserted in the flow-chart (instruction pasting); insert the other file (file inserting). Details of the insert processing are explained later with reference to the flow-chart shown in FIG. 3. At step S6, the flow-chart is edited in terms of individual instruction block, that is block by block. The instruction block means a group of instruction symbols 201 corresponding to "concatenation", "selection", and "repetition" in the structured programming, and "selection" and "repetition" symbols are encircled by dotted and solid lines, respectively, as they are shown in the flow-chart.

Figure 3:
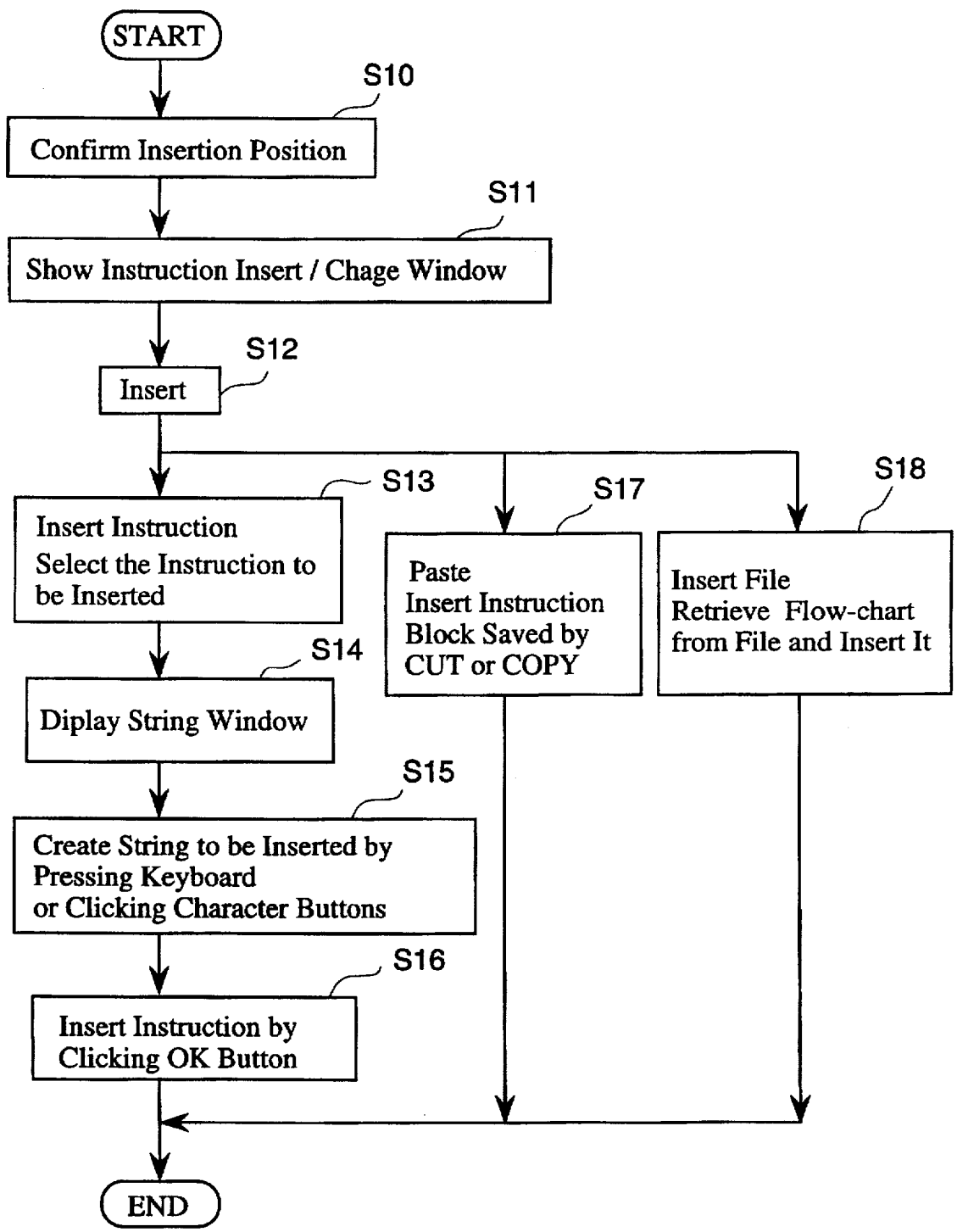
FIG. 3 is a flow-chart illustrating how the procedure for inserting instructions is performed.

The insert processing at step S2c, i.e. inserting the instruction into the flow-chart is initiated upon clicking the flow-line button 104 in the flow-chart. More specifically, as shown in FIG. 3, first, at step S10, the position of the selected flow-line button 104 is detected. This is done by detecting the position of the pointer that has been clicked. At step S11, the instruction insert/change window 106 is displayed. Shown in this instruction insert/change window 106 are various instruction symbols 201 and their meaning. At step S12, it is determined which of the insert processing is possible, and based upon its finding, some or all of the insert buttons at the bottom of the instruction insert/change window 106 are made selectable. If cutting or copying has been done prior to the insert processing, then the paste button 112 is made selectable. In the instruction insert/change window 106, the instruction insert button 107, the file insert button 108 and the cancel button 109 are normally selectable.

Figure 9:
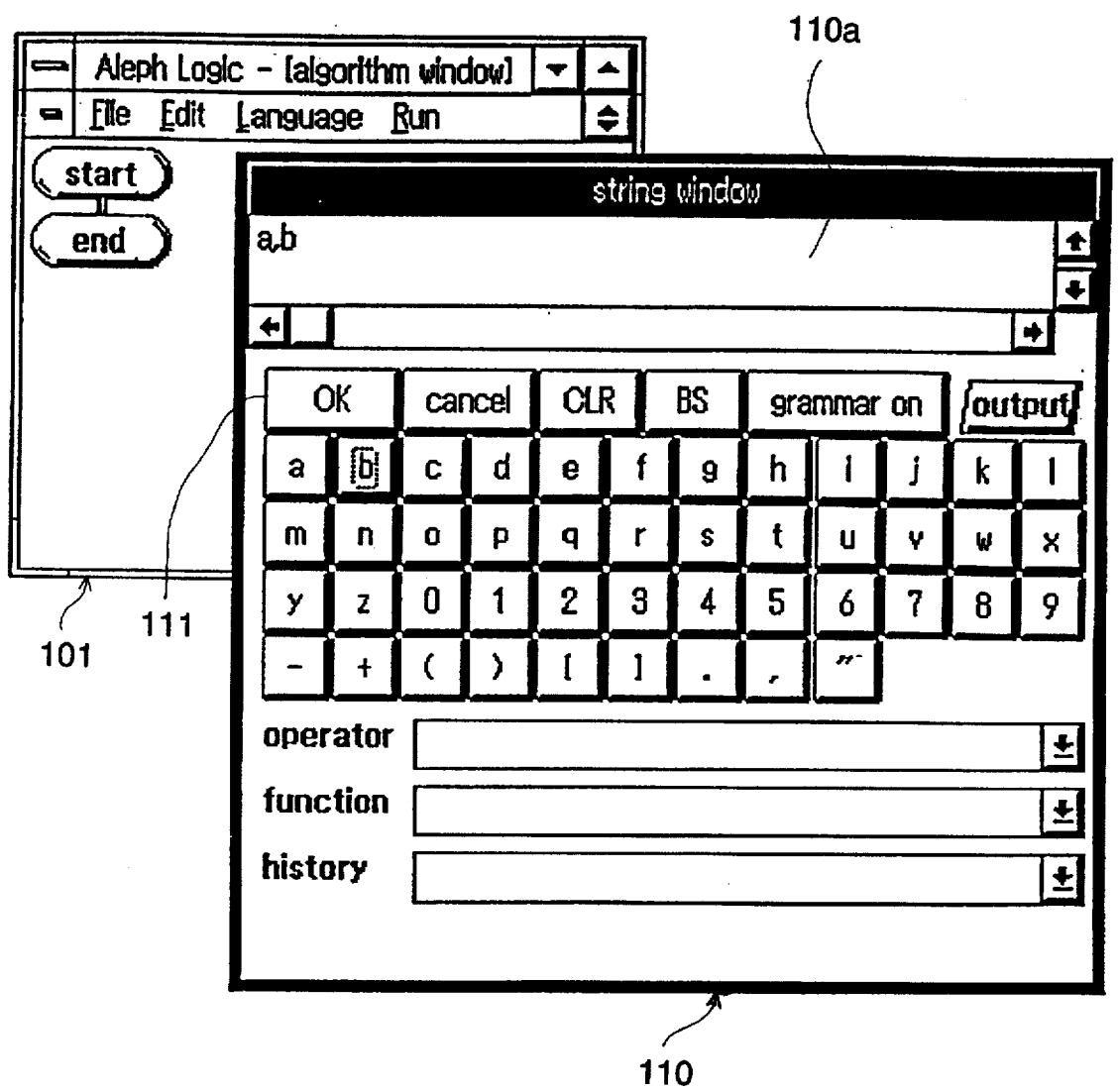
FIG. 9 is an illustration showing the string window of the present program which comes up when an instruction symbol is selected during the instruction inserting procedure.

At step S13, the selected instruction symbol 201 is detected and then confirm if the instruction insert button 107 has thereafter been clicked. At step S14, if it is confirmed that the instruction insert button 107 has been clicked, the instruction string window 110 pops up on-screen (FIG. 9). This instruction string window 110 is for inserting letters/ characters into the instruction symbol 201, and the letters can be entered by the mouse operation. With the instruction string window 110 active, it is possible to enter the instruction string either from the keyboard 2a or by the on-screen mouse operation. The strings that can be entered include kanji or Chinese letters, Japanese kana letters, alphabetic letters relating solely to the on-screen display purposes, alphabetic letters relating to functions and variables for algorithm computation, and symbols for the four fundamental operations of arithmetic. At step S15, after confirming the entered string, the insert string is created. The entered string is shown in the display column/field 110a at the top of the string window 110. In FIG. 9, alphabetic letters "a" and "b" are shown in the display field together with a comma ",", representing a symbol that separates the entered letters. At step S16, after confirming that the OK button 111 in the string window 110 has been clicked or else the return key on the keyboard has been pressed, the instruction inserting process/procedure is brought to an end. At step S17, if any instruction block has been saved by cutting or copying procedure prior to the insertion process, then the saved instruction block is also inserted in the flow-chart. At step S18, any flow-chart that has already been created and saved in a file is retrieved and inserted.

Figure 4:
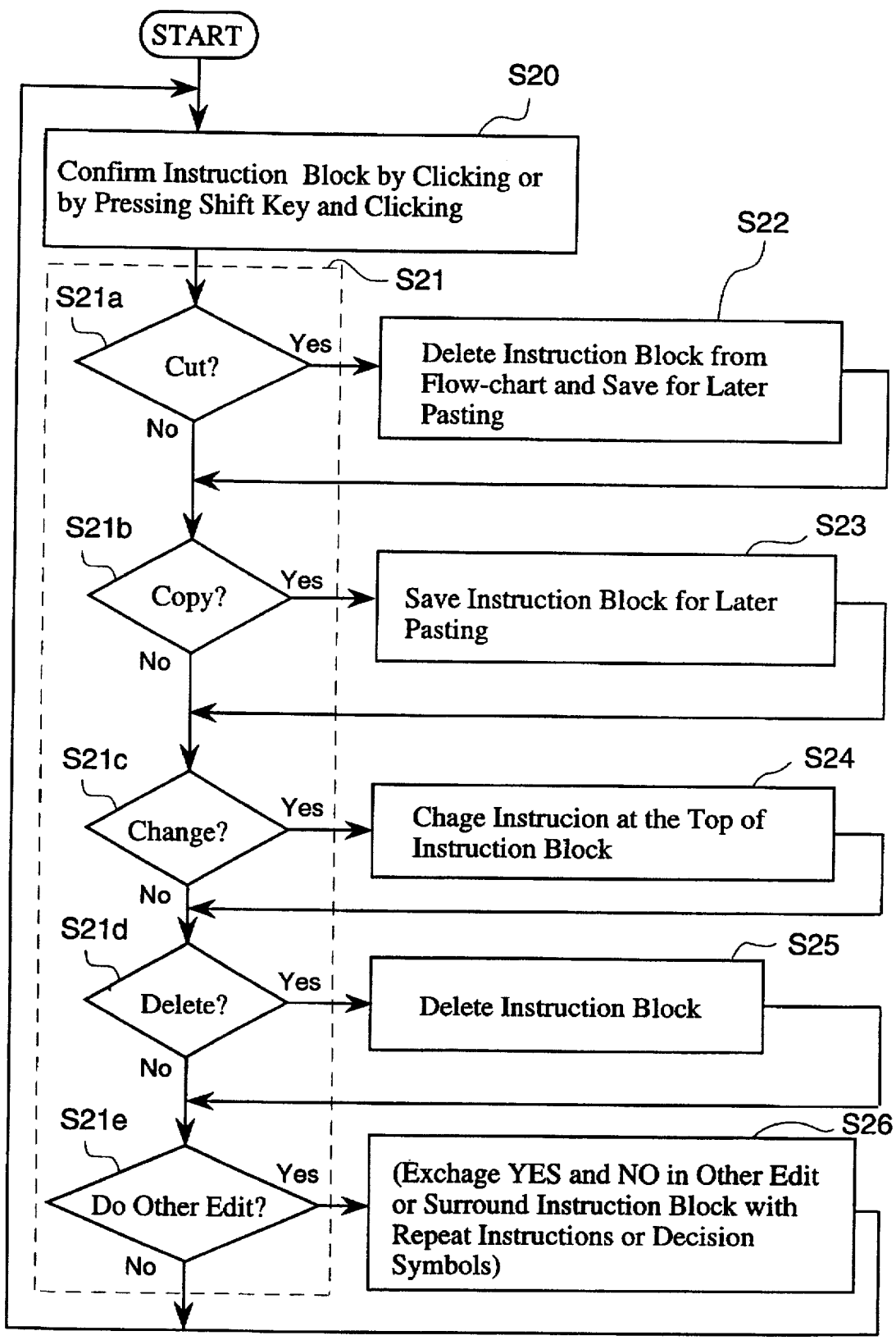
FIG. 4 is a flow-chart illustrating how the procedure for editing instructions is performed.

The flow-Chart shown in FIG. 4 is for editing the commands in the flow-chart displayed on-screen in the algorithm window 101 from one command block to another. At step S21, it is confirmed if the the command block to be edited has been selected by clicking the mouse 2b, or by clicking the mouse 2b while pressing down the shift key 2a. At step S21, it is verified if any valid command has been entered after the selection of the command block to be edited. Commands valid for editing the command block include "cut", "copy", "change", "delete", and "other edit." And the verification of the entered commands is carried out in the order of the "cut" at step S21a, the "copy" at step S21b, "change" at step S21c, "delete" at step S21d, and "other edit." at step S21e. If the "cut" is confirmed at step S21a, then the process goes on to step S22. If the "copy" is validated at step S21b, then the process goes on to step S23. If the "change" is established at step S21c, then the process proceeds to step S24. If the "delete" is confirmed at step S21d, then the process goes on to step S25. If the "other edit" is confirmed at step S21e, then the process proceeds to step S26.

Figure 8:
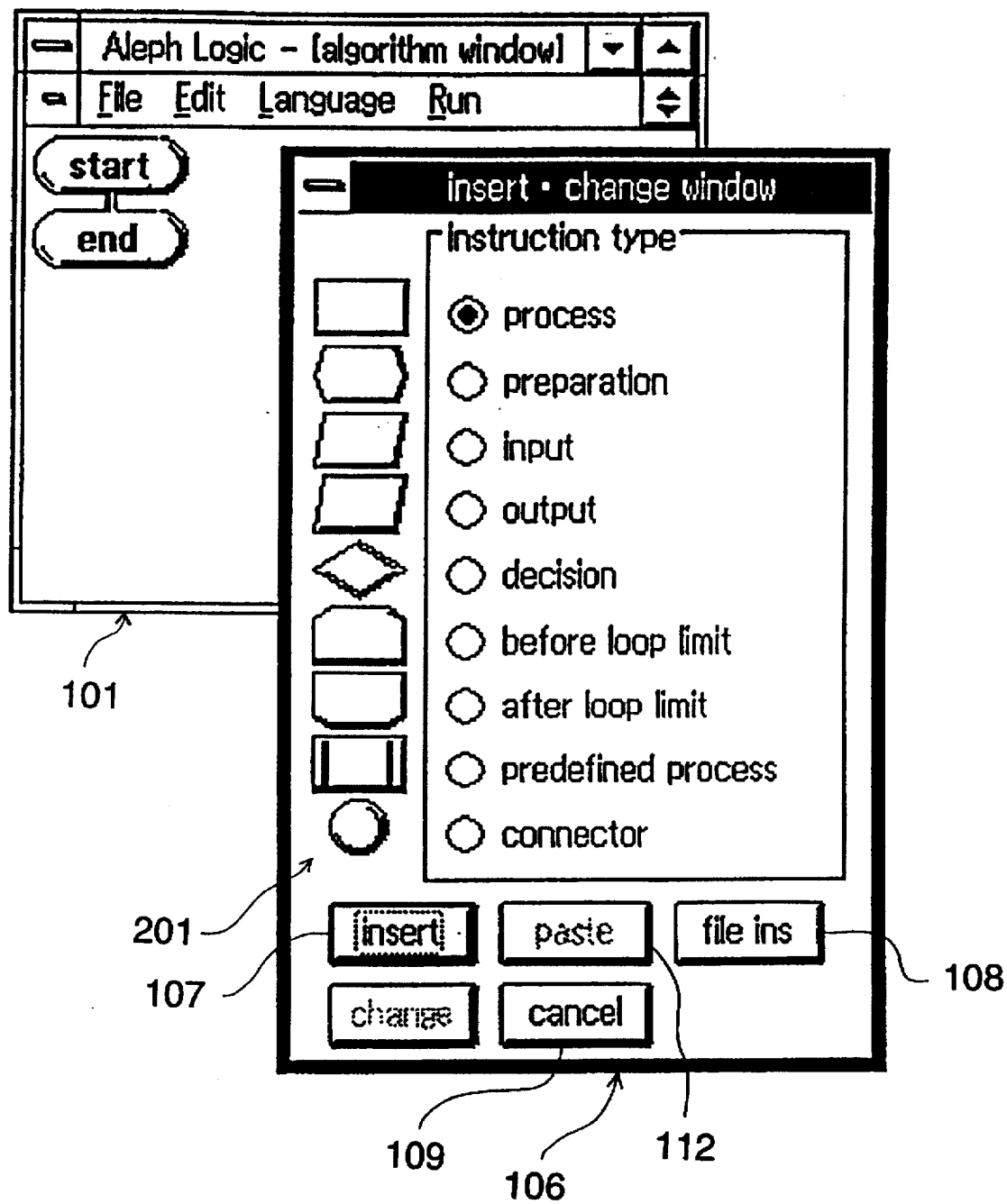
FIG. 8 is an illustration showing the insert/change window of the present program which comes up when the instruction inserting procedure it to be carried out.

At step S22, the selected command block is deleted from the flow-chart and saved in a temporary file in the computer for a later pasting purpose. More specifically, while the selected command block is cut and removed away from the flow-chart on the algorithm window 101, it is temporary saved in the memory of the computer 3. The command block thus cut out and saved will be inserted back into the specified position upon entering the paste command (at step 18). At step S23, the selected command block is also temporarily saved in the memory of the computer for use in a later pasting procedure. But unlike the "cut" command, the selected command block is not removed from the algorithm window 101, but just copied into a temporary file by the "Copy" command. This copied command block can be pasted into any position as specified. At step S24, the command symbol 201 at the top of the designated command block is changed. At this step, the insert/change window 106 pops up as shown in FIG. 8 where any command symbol 201 listed in the sub-window may be selected to replace the current command symbol 201 at the top of the selected command block. At step S26, editing processes other than explained above are executed. Such editing processes include, for example, exchanging the "YES" decision with the "NO" decision and vice versa in the command block, surrounding the command block with the loop limit symbol and/or the decision symbol, merging a plurality of similar successive symbols into one, or conversely, separating a plurality of strings contained in one instruction symbol one another and assigning each string into an individual instruction symbol.

Figure 5:
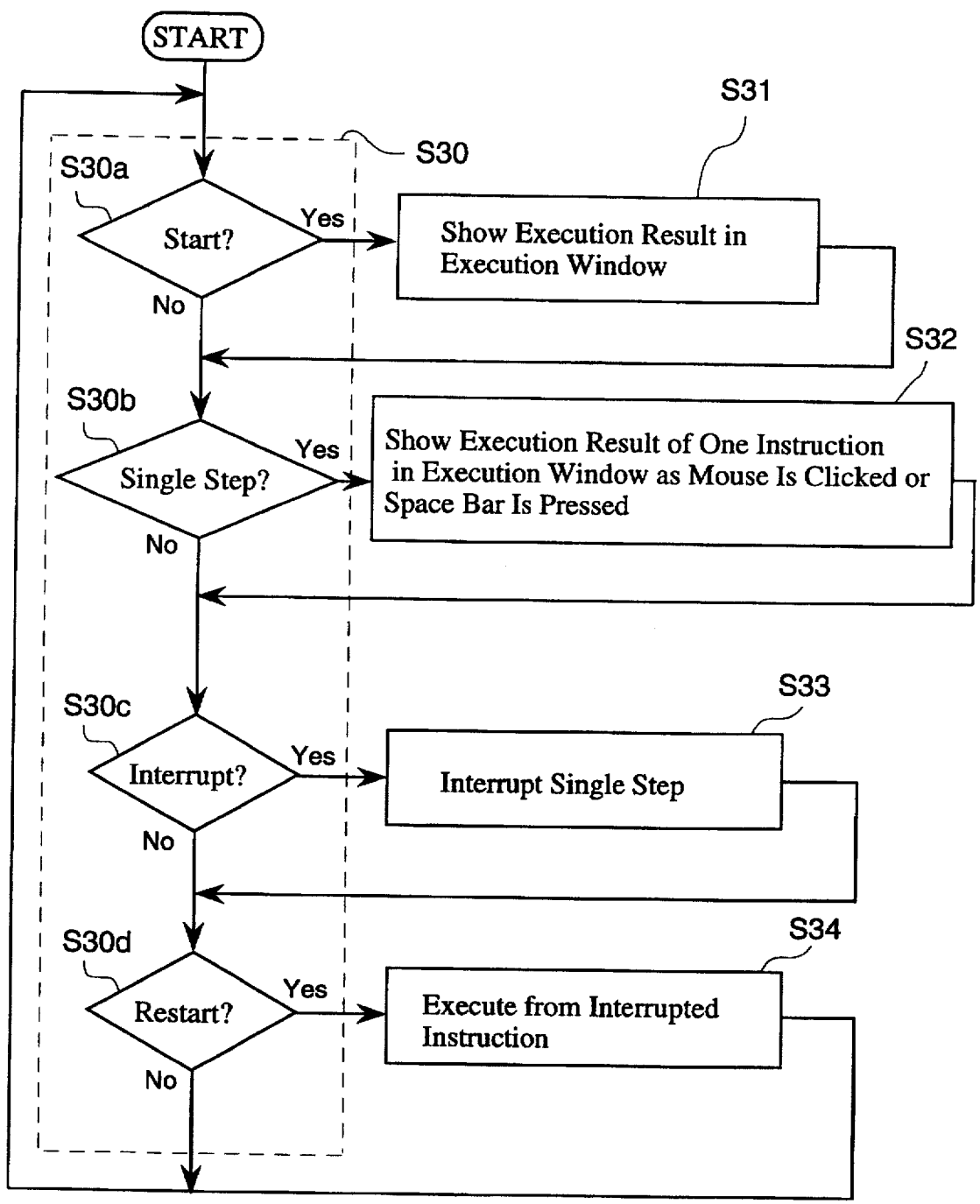
FIG. 5 is a flow-chart illustrating how the procedure for executing instructions is performed.
Figure 6:
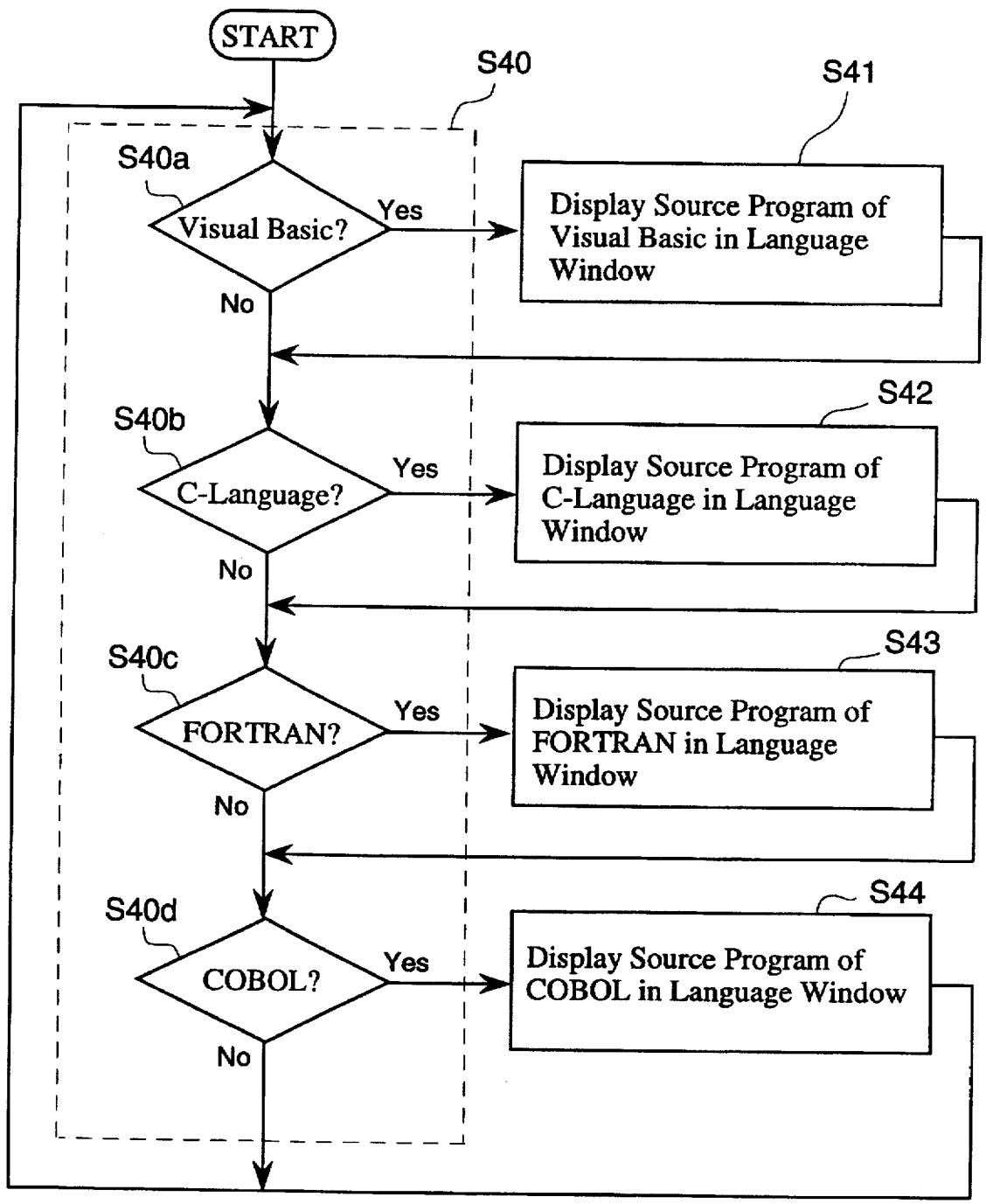
FIG. 6 is a flow-chart illustrating how the procedure for selecting a specific programming language is performed.
Figure 11:
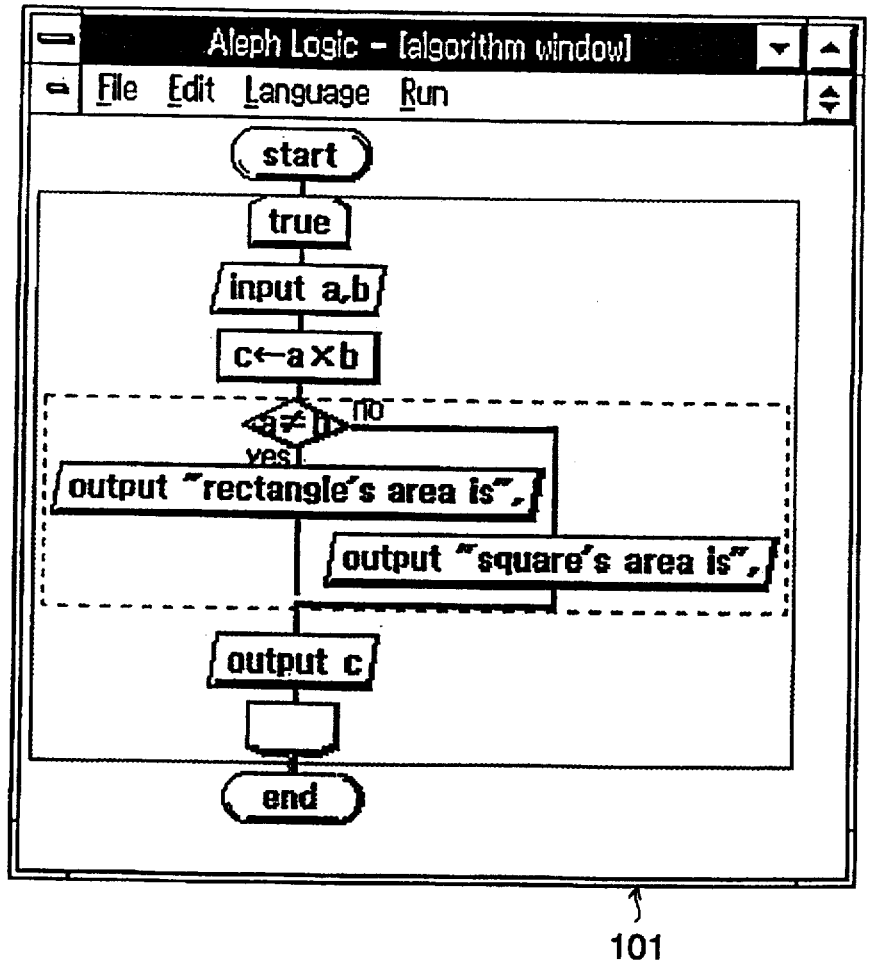
FIG. 11 is an illustration showing the algorithm window of the present program with the created flow-chart displayed on-screen.
Figure 12:
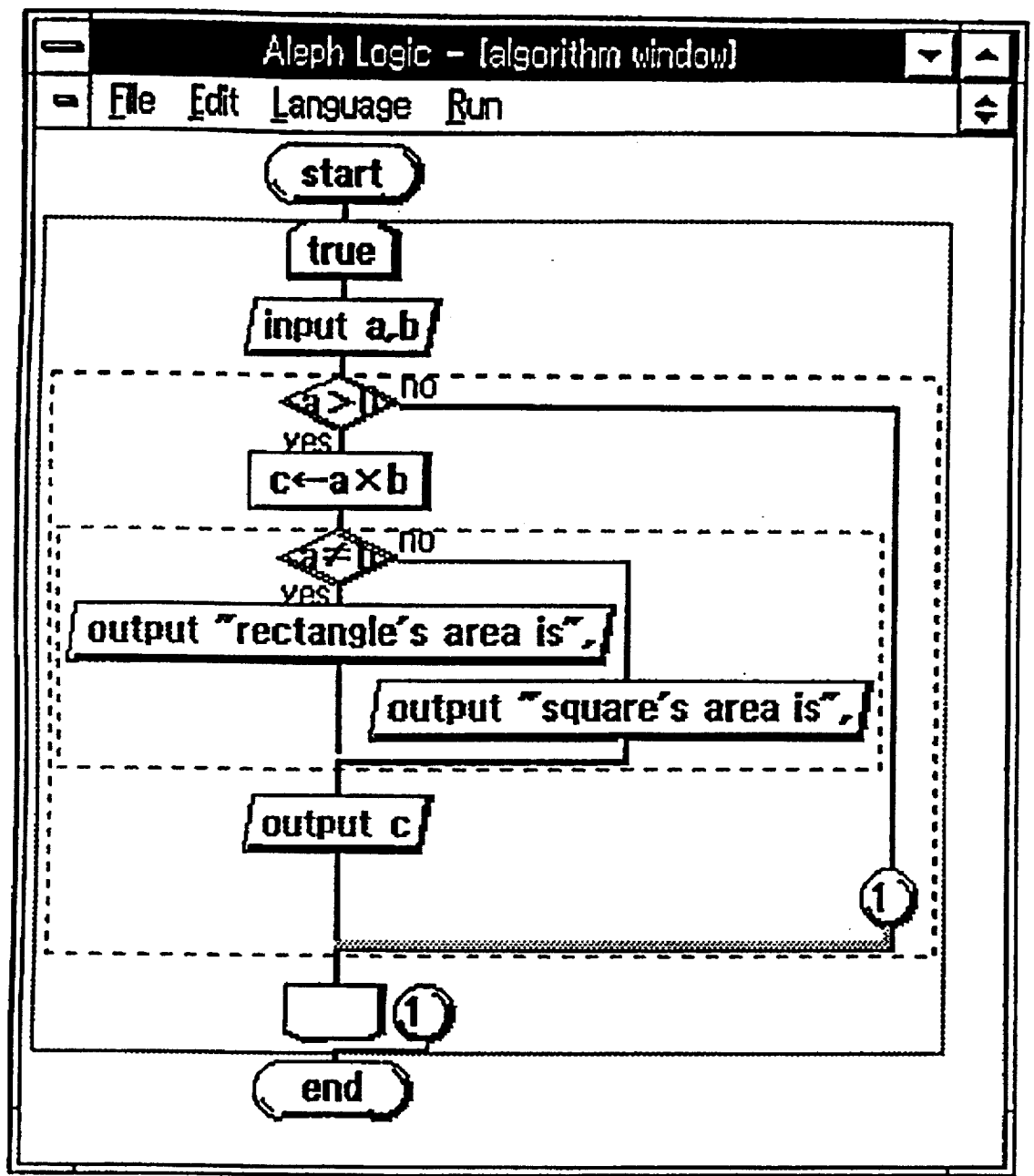
FIG. 12 is an illustration showing the algorithm window of the present program With the created flow-chart displayed on-screen.
Figure 13:
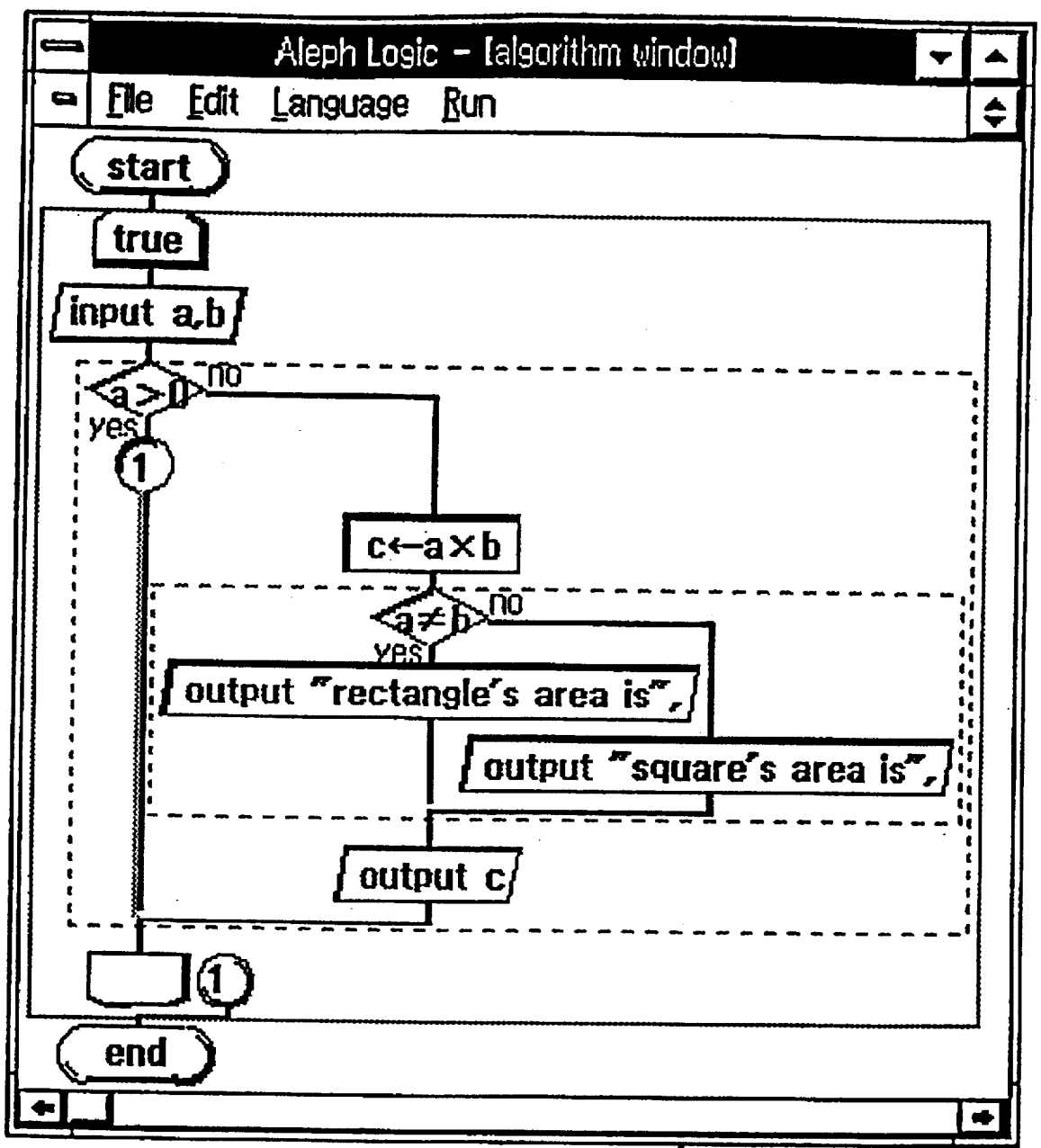
FIG. 13 is an illustration showing the algorithm window of the present program with one decision instruction symbol has been changed during the instruction changing procedure.
Figure 14:
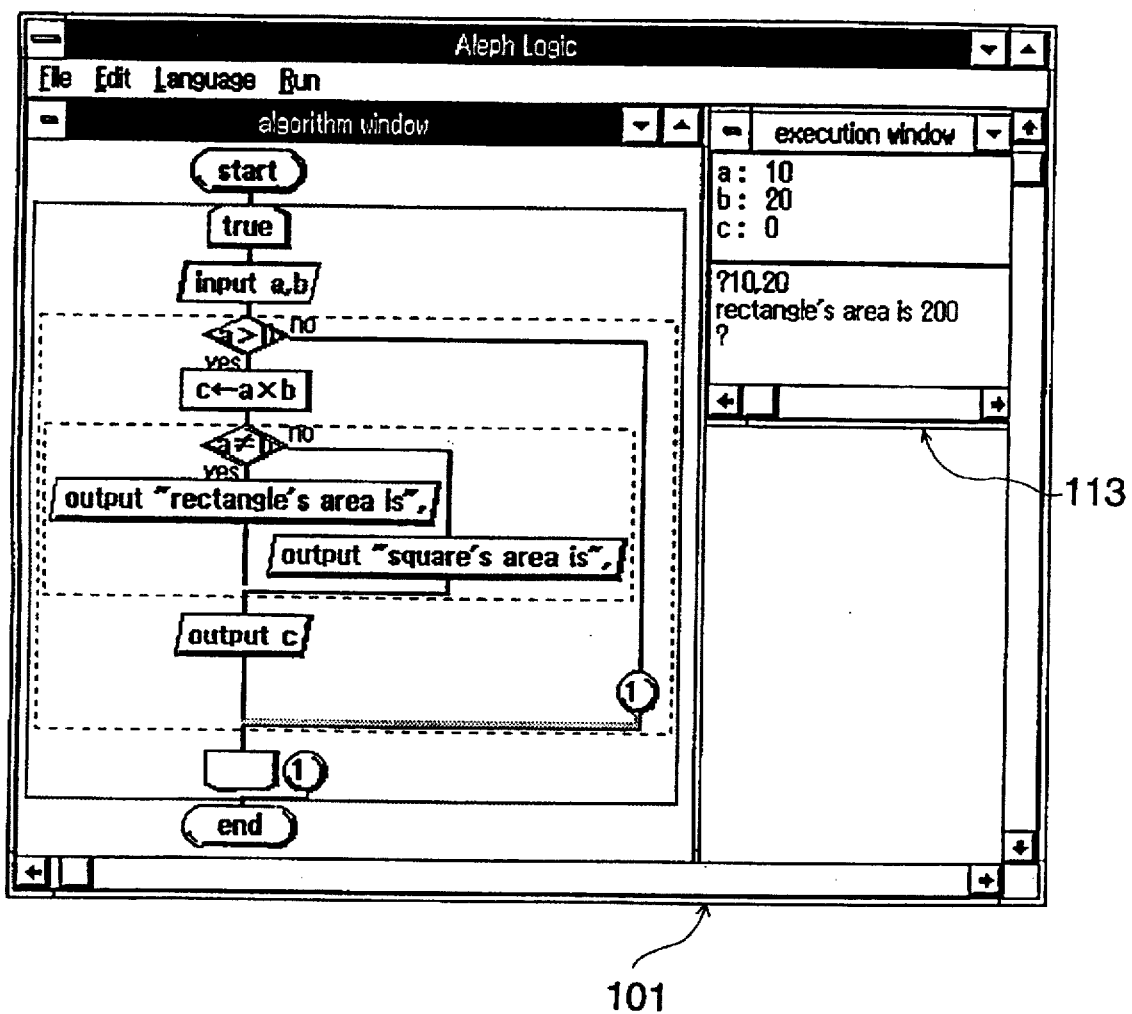
FIG. 14 is an illustration showing the algorithm window of the present program while the procedure expressed by the flow-chart is being performed.

The flow-chart of FIG. 5 illustrates the procedure for executing the flow-chart specified by the algorithms as shown, for example, in FIGS. 11 and 12. At step S30, after the run menu in the menu bar having been selected, it is decided if the relevant instructions are entered. These instructions relevant to the run menu include "start", "single step", "interrupt", and "restart." And the verification of the entered instructions is carried out successively in the order of the "start" at step S30a, the "single step" at step S30b, the "interrupt" at step S30c, and the "restart." at step S30d. In case it is verified that the start instruction has been entered, then the result obtained by its execution at step S31 will be displayed in the execution window 113 (FIG. 14). If case it is established that the single step instruction has been entered, then the result obtained by executing each instruction symbol upon clicking it or upon pressing the space bar at step S32 will be displayed in the execution window 113. Unlike at the step S31, all the results of instruction execution are not shown in the window at step S32. Instead only one instruction is to be executed upon each clicking or pressing of the space bar. If case it is established that the interrupt instruction has been entered, then the execution process launched by the start instruction is interrupted at step S33. If case it is established that the restart instruction has been entered, then the execution of the previously interrupted instruction is restarted from the instruction symbol 201.

This embodiment of the invention is so designed that it is possible to produce a source program for the created flow-chart using a suitable programming language. Specifically, upon selecting the language menu in the menu bar 105, a list of programming languages appears on-screen. Then select any one of them, and the source program for the flow-chart is created with the programming language specified. In FIG.

6, the step S40 is an input verifying step, where it is established if any of the listed programming languages has been selected, beginning at sub-step S40a for Visual Basic, and going on to sub-step S40b for C-language, sub-Step S40c for FORTRAN, and finally sub-step S40d for COBOL. In case the programming language has been selected, the source program corresponding to the specified language from among Visual Basic, C-language, FORTRAN and COBOL is displayed in the language window 114 (steps S41 to S44). More specifically, if any of the listed programming languages is selected, then the process for converting the flow-chart into the selected programming language starts, resulting in the display of the source program thus created in the program window 114 (FIG. 14).

The procedure for converting the flow-chart into a program written by a programming language is now described. First, each of the instruction symbols 201 written into the flow-chart is verified, then the string entered in each instruction symbol 201 is established, leading to the formation of a programming step with the instruction symbols 201 and the strings. It is further checked if there remain unverified instruction symbols 201. If unverified instruction symbols exist, then the above step is repeated until finally no unverified instruction symbols are found. At this point, the procedure comes to an end. It should be noted that every one of the instruction symbols 201 has its own program saved, and combining the program with the string entered in the instruction symbol results in the creation of the programming steps corresponding to the particular flow-chart.

With the above arrangement, the learning of the algorithm starts with creating a flow-chart in the algorithm window 101. In order to produce a desired flow-chart, a sequence of requisite instruction symbols 201 must be entered in the algorithm window 101 between the start button 102 and the end button 103 in a flow of task corresponding to the algorithm to be learned.

To describe in more detail, clicking the flow-line button 104 between the start button 102 and the end button 103 in the algorithm window 101 pops up the insert/change window 106 (FIG. 8). Drag the pointer onto any one of the instruction selection buttons 201a that corresponds to the desired instruction symbol 201, then click the button. Upon clicking, the insert/change window 106 disappears, and the string window 110 appears on-screen (FIG. 9).

With the string window 110 popping up, it becomes possible to enter a string of letters that designates the instruction to be introduced into a particular instruction symbol 201. To do so, enter the desired string of letter from the actual keyboard 2a or from the graphical on-screen keyboard displayed in the string window 110. If the string thus entered is correct, click the OK button 111 or press the return key on the keyboard and bring the string entering operation to a close. Then the string window 110 disappears from the screen and the flow-chart now including the instruction symbols 201 is displayed on the algorithm window 101. This insertion of the instruction symbol 201 causes new flow-line buttons 104{??}' to bridge between it and the start button 102 as well as the end button 103 (FIG. 109). In case the inserted instruction symbol 201 is a decision instruction, a flow button 104 to the "YES" and a flow button 104 to the "NO" are created in the algorithm window 101, at the same time, the "decision" instruction block in the structured programming produced as the result of inserting the decision instruction is surrounded by a dotted line.

In this manner, repeating the process of selecting a flow-line button 104 at the position into which a instruction symbol 201 is to be inserted, selecting the desired instruction symbol 201 at that position, and entering a string of instruction will result in a complete flow-chart. In the process of this operation, the algorithm training program of the invention will carry out first a sequence of the steps of S1~S2c~S5, and then a sequence of the steps of S10~S11~S12~S13~S14~S15~S16 during which program will insert desired strings and instruction symbols 201 at positions specified by the mouse operation of the learner (FIGS. 11 and 12).

For the flow-chart displayed in the algorithm window 101, it is possible, through selecting the edit menu in the menu bar 105, to insert any instruction block or flow-chart that has already been created and saved in a separate file. More specifically, if one or more instruction blocks exist in a previously created flow-chart, which are usable in the flow-chart currently in the making on the screen, then open the file which contains the instruction block(s), copy it/them, and finally paste onto the current flow-chart. Or else, open the saved file that has the desired flow-chart, copy the whole flow-chart and paste it into the current flow-chart. In this instance, the present algorithm training program will perform the steps S17 or S18 after carrying out the step S12. When it is intended to modify the already created flow-chart, specify that instruction block which includes the instruction symbol to be changed, and give instruction for change to the instruction symbol at the top of the block. As the result of this operation, the "true" and "false" indications in the first decision symbol in the flow-chart are switched over, and whole arrangement of the flow-chart is modified accordingly.

For verifying the target algorithm, the flow-chart thus created will be run. When it is intended to execute successively all the instruction symbols 201 of the flow-chart, first click the "RUN" menu in the menu bar 105 of the algorithm window to open the execution menu, then click the "START" to run the flow-chart. The algorithm training program will execute a sequence of the steps S30a~S31. The results of the execution are shown in the execution window 113. The execution window 113 will appear on-screen together with the algorithm window so that they give complete picture of the flow-chart being run. On the other hand, if it is desired to execute the instruction symbols 201 one by one, then after clicking the "SINGLE STEP" in the execution menu, press the space bar or drag the pointer onto the desired instruction symbol 201 in the algorithm window 113 and click it to see if the execution results are correct. In the single-step execution, the algorithm training program will perform a sequence of the steps S30b~S32 separately one by one, and show its results for each step in the execution window (FIG. 14). It should be noted that if any instruction symbol is not executable in the running of the flow-chart, then its reason may be given on-screen in the error message window.

In this way, the learner can create a flow-chart and verify the algorithm represented by that flow-chart without ever touching the programming language used. Phrased differently, the learner do design the flow-chart that he or she needs but does not have to be involved in the programming language behind it at all. Yet he or she can verify in an instance if the instructions in the algorithm are appropriate or correct much the same way as he/she executes the program embodying the algorithm. Moreover, in the completed flow-chart, any instruction block in the structured programming is identified with an encircling dotted line, making it possible to readily understand the algorithm at the time of flow-chart confirmation. In addition, the fact that the instruction symbols 201 in the flow-chart is executable separately one by one helps the learner take a quick and solid grasp on the meaning of one and each instruction symbol 201 in the algorithm.

In this connection, it should be pointed out that the learner's training in the algorithm with the present training program may also be carried out using an unfinished flow-chart that has already been saved in the auxiliary data storage device 3e. In this case, the learner is encouraged to complete the unfinished flow-chart. In the process of creating the rest of the given flow-chart, the learner will have to understand the algorithm expressed in the original flow-chart and create a new one of his/her own design at the same time. In order for the learner to perfect the unfinished flow-chart, he must first have a full understanding of the flow-chart, and, with it, the learner can grasp how the algorithm written into the flow-chart works. The whole process of learning is quite effective and efficient as compared to learning the program written in a programming language line by line and filling out the unfinished lines of the algorithm. It is also much easier for the learner to understand.

Figure 15:
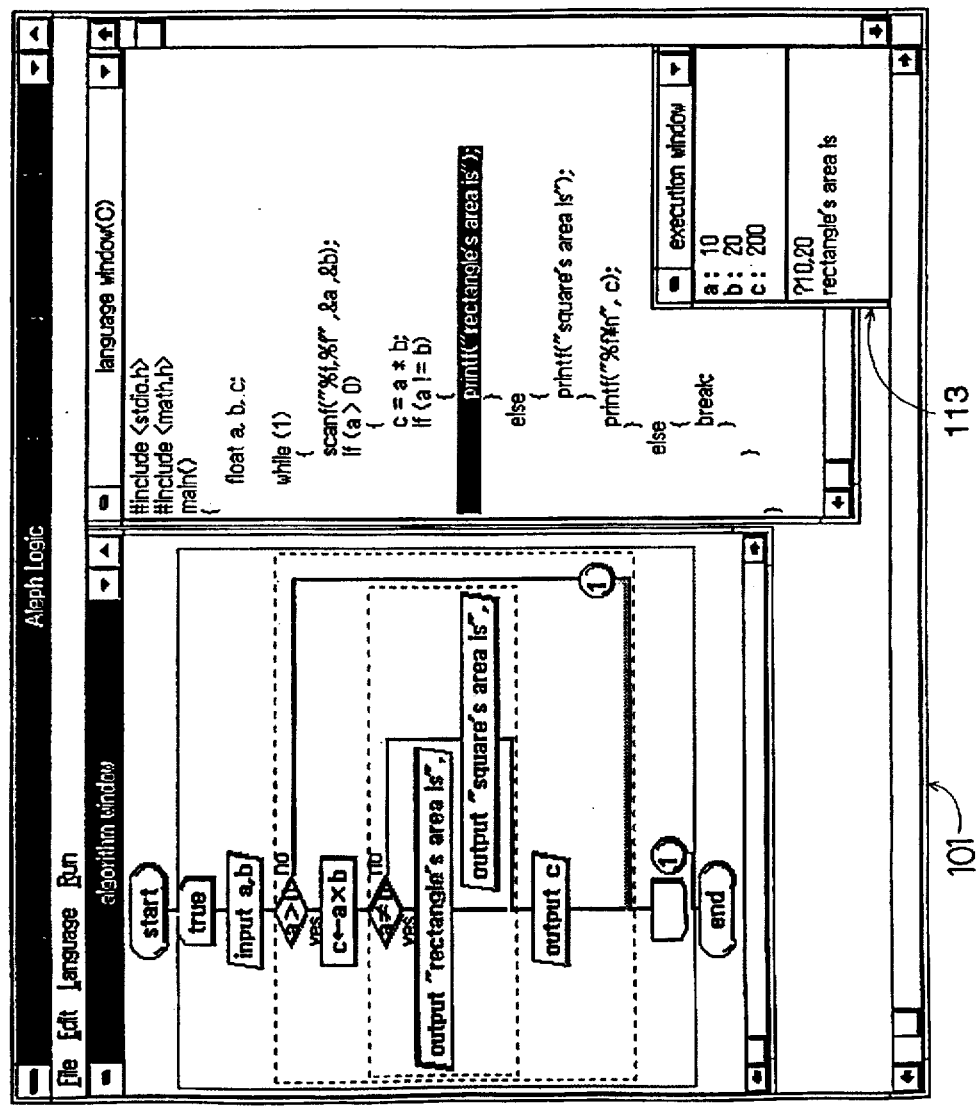
FIG. 15 is an illustration showing the algorithm window of the present program while the program created by a selected programming language is being executed in a single-step manner.

As one of the outstanding features of this embodiment, simply clicking the desired programming language in the language menu on the menu bar 105 of the algorithm window 101 will automatically create the source program in that language. And both the flow-chart and its source program are verifiable on the same screen. For example, if the C-language is selected, the algorithm training program of the invention will execute the steps S40b–S41 in sequence and show in the language window 114 the whole text of the program created in that language for the flow-chart. At this point,. as each of the instruction symbols 201 is executed one by one, a corresponding portion in the text of the source program is covered with a mesh screen in order to show the learner the progress of instruction execution (FIG. 15).

It is pointed out that this invention is not limited to the particular embodiment described hereinabove. For example, the algorithm training program of the invention may be so designed that by clicking any instruction symbol 201 a note for the selected symbol may become possible. More specifically, a note window may be provided for each of the instruction symbols 201, and clicking any particular symbol will pop up its note window where a brief text explaining the object or function of the instruction symbol in the algorithm is entered. This note display function may be used for making a question for the learner. For example, a part of the string for a particular instruction symbol may be omitted while the process to be performed by that symbol is explained in the note window of its symbol. The learner will be asked to enter or fill out the missing part of the string, thereby completing the flow-chart.

Figure 10:
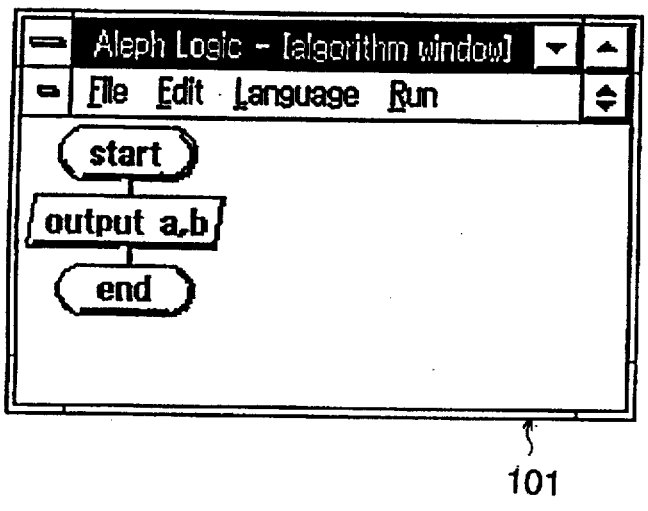
FIG. 10 is an illustration showing the algorithm window of the present program when an instruction symbol has been inserted during the instruction inserting procedure.

When a color monitor is employed as the display device, the algorithm training program of the invention may be so designed that, when the string is to be shown in the instruction symbol 201, the program may show different parts of the string in different colors. Taking for example the string "Enter a, b" in FIG. 10, "a, b" may preferably be shown in black in sharp contrast to the background color of gray, while "Enter" may be shown in blue. Color selection is also useful for other text displays. For example, if an error is detected in the execution of the newly created flow-chart, or if a instruction symbol 201 inserted in the flow-chart is decided not executable because both the instruction symbol and its inserted position are not proper, the string in that particular instruction symbol 201 may be displayed in red for warning purpose.

If a macro language is included in a specific application program as a programming language, creating a flow-chart results in the creation of a program by the macro language with the desired instructions pre-recorded, which relieves the learner of painstaking efforts to learn a complex macro language. In this instance, it is possible to create necessary macro files by relating the program thus formed with the specific application program.

As can readily be understood from the detailed explanation given above, the algorithm training software application of the invention creates a flow-chart embodying an intended algorithm using the algorithm creating means, verify the algorithm expressed with the flow-chart by the verifying means, and show the results of the verification on-screen by the display means. This procedure enables the learner to understand a variety of algorithms with ease. The fact that the training in the algorithm is done using the flow-chart makes it possible to show on-screen those instructions not involved in the algorithm and instruction blocks in the structured programming as well, which in turn is helpful in understanding the algorithm graphically or visually. The graphical representation of the algorithm is especially useful for a novice in having a deeper understanding about the algorithm.

Incorporating the means for translating the flow-chart into a program in a specified programming language effectively eliminates the need to acquire the programming language as an essential prerequisite for the algorithm learning. Yet since the programs corresponding to the flow-chart can also be shown on-screen, the learner may develop his or her understanding of the programming language while learning the algorithm.

While the preferred form of the present invention has been described, it is to be understood that modifications will be apparent to those skilled in the art without departing from the spirit of the invention.

What is claimed is:

1. An algorithm training system, comprising:
   first means, for displaying information, including flow-chart symbols and flow-lines;
   second means, for entering instructions;
   third means, for creating a flow-chart from flow-chart symbols and flow-lines in accordance with said instructions entered by said second means;
   fourth means, for translating said flow chart created by said third means into a program of a selected programming language; and
   fifth means, for verifying an algorithm expressed by said flow-chart created by said third means and for displaying the results of the verification,
   wherein, during the verification, that portion of said flow-chart being executed and a corresponding portion of said program are displayed simultaneously.

2. An algorithm training system according to claim 1 where said third means includes means for selecting desired flow-chart symbols and flow-lines from among the flow-chart symbols and flow-lines being shown; and means for character entering means for entering a desired character into the flow-chart symbol selected by said selecting means.

3. An algorithm training method, comprising the steps of:
   (1) displaying information, including flow-chart symbols and flow-lines;
   (2) entering instructions;
   (3) creating a flow-chart from flow-chart symbols and flow-lines in accordance with said instructions entered by said step (2);

(4) translating said flow chart created by said step (3) into a program of a selected programming language;

(5) verifying an algorithm expressed by said flow-chart created by said step (3); and (6) displaying the results of the verification of said step (5), and displaying, simultaneously, that portion of said flow-chart of said step (3) and that portion of said program of said step (4) currently being executed.

4. An algorithm training system, comprising:

a display device;

an input mechanism;

a flow-chart generator, wherein said flow chart generator generates a flow-chart from flow-chart symbols and flow-lines in accordance with instructions entered by said input mechanism;

a translator, wherein said translator translates said flow-chart into a program of a selected programming language; and a verifier, wherein said verifier verifies an algorithm expressed by said flow-chart and displays the results of the verification on said display device, wherein, during the verification, that portion of said flow-chart being executed and a corresponding portion of said program are displayed simultaneously.

* * * * *